(12) United States Patent
Bruce

(10) Patent No.: US 7,108,334 B2
(45) Date of Patent: Sep. 19, 2006

(54) SNAP-ON WHEEL COVER

(75) Inventor: Jeff Bruce, Fowlerville, MI (US)

(73) Assignee: McKechnie Vehicle Components (USA), Troy, MI (US)

(*) Notice: Subject to any disclaimer, the term of this patent is extended or adjusted under 35 U.S.C. 154(b) by 0 days.

(21) Appl. No.: 10/892,408

(22) Filed: Jul. 15, 2004

(65) Prior Publication Data

US 2006/0012241 A1  Jan. 19, 2006

(51) Int. Cl.
*B60B 7/14* (2006.01)
*B60B 7/00* (2006.01)

(52) U.S. Cl. .............................. 301/37.373; 301/37.102

(58) Field of Classification Search .......... 301/37.101, 301/37.102, 37.31, 37.372, 37.373, 37.42
See application file for complete search history.

(56) References Cited

U.S. PATENT DOCUMENTS

| | | | |
|---|---|---|---|
| 4,382,635 A | 5/1983 | Brown et al. | |
| 4,707,035 A | 11/1987 | Kondo et al. | |
| 4,842,339 A | 6/1989 | Roulinson | |
| 4,998,780 A | 3/1991 | Eshler et al. | |
| 5,163,739 A | 11/1992 | Stanlake | |
| 5,667,281 A | 9/1997 | Ladouceur | |
| 6,022,081 A | 2/2000 | Hauler et al. | |
| 6,135,570 A | 10/2000 | Wieczorek | |
| 6,227,623 B1 * | 5/2001 | Bellow | 301/37.42 |
| 6,325,461 B1 | 12/2001 | Hauler | |
| 6,585,330 B1 | 7/2003 | Bruce | |
| 6,663,189 B1 * | 12/2003 | Enomoto et al. | 301/37.36 |
| 6,682,151 B1 | 1/2004 | Van Houten et al. | |
| 6,913,322 B1 * | 7/2005 | Allen | 301/37.371 |
| 6,953,226 B1 * | 10/2005 | Bruce et al. | 301/37.373 |
| 2003/0184146 A1 | 10/2003 | Jensen et al. | |

\* cited by examiner

*Primary Examiner*—Jason R. Bellinger
(74) *Attorney, Agent, or Firm*—Butzel Long

(57) ABSTRACT

A snap on wheel cover that includes a plurality of finger elements that cooperate with a locking ridge on lug nuts that are used to secure a wheel onto a vehicle hub. The plurality of finger elements include first finger elements that engage a first surface of the locking ridges of the lug nuts when the wheel cover attached to the wheel and second finger elements that engage and apply a biasing force to a second opposite surface of the lug nuts when the wheel cover attached to the wheel. Third finger elements can also be provided which are configured to be deflected inward when contacted by either the first or second side of the locking ridges of the lug nuts.

22 Claims, 3 Drawing Sheets

SNAP-ON WHEEL COVER

TECHNICAL FIELD

The present invention relates generally to wheel assemblies that include decorative wheel covers that are attached to underlying wheels. More specifically, the present invention is directed to a mechanical system for securing decorative wheel covers to wheel assemblies.

BACKGROUND ART

It is known to provide and attach wheel ornamentations such as wheel caps and wheel covers on the wheels of vehicles in order to enhance the overall appearance of vehicle wheels and wheel assemblies. Wheel ornamentations are less expensive to manufacture than one-piece wheels. In addition, wheel ornamentations provide various types of appearances and styling variations, all of which may be combined with a single wheel design.

It is also known to manufacture the wheel ornamentations from plastic materials and attach the plastic wheel ornamentations to lug nuts that are used to secure wheels on vehicles. An example of such a wheel ornamentation is disclosed in U.S. Pat. No. 6,022,081 to Hauler et al. In this patent, an ornamental wheel cover is provided with a number of elongated tubular extensions axially projecting from an inboard side of the cover that are each partially slotted to provide cantilevered fingers. Each finger has an undercut groove that has a shoulder, which positively positions the cover to an upper shoulder of the lug nuts of the wheel. Below the undercut groove is a bulbous portion that contacts the lug nut below the flange or locking ridge and engages the underside of the flange or locking ridge, thereby retaining the cover on the lug nut.

One disadvantage of the plastic wheel ornamentation of U.S. Pat. No. 6,022,081 to Hauler et al. is that, as the lug nuts become heated by the wheel as the wheel rotates, heat is transferred to the extensions of the plastic wheel ornamentation. The heating of the extensions of the extensions causes a decrease in the retention force of the extensions. The decreased retention force of the extensions tends to result in the wheel ornamentation disengaging the wheel.

Patent application Publication No. 2003/0184146 to Jensen et al. is directed to a wheel ornamentation assembly that includes a wire retainer that cooperates with retention legs which axially extend from an inboard surface of a wheel ornamentation. The wire retainer provides mechanical support to the retention legs and prevents the wheel ornamentation from disengaging lug nuts of the wheel assembly.

Other design configurations for securing wheel ornamentations to wheels are exemplified in U.S. Pat. No. 4,382,635 to Brown et al., U.S. Pat. No. 4,707,035 to Kondo et al., U.S. Pat. No. 4,842,339 to Roulinson, U.S. Pat. No. 4,998,780 to Eshler et al., U.S. Pat. No. 5,163,739 to Stanlake, U.S. Pat. No. 5,667,281 to Ladouceur, U.S. Pat. No. 6,135,570 to Wiecorek, U.S. Pat. No. 6,325,461 to Hauler, U.S. Pat. No. 6,585,330 to Bruce and U.S. Pat. No. 6,682,151 to Van Houten et al.

The present invention provides mechanical systems for securing wheel covers to wheel assemblies which mechanical systems include a plurality of differently configured finger elements that cooperate so as to compensate for thermal effects that tend to loosen the attachment of a wheel cover to a wheel assembly.

The wheel covers of the present invention together with the mechanical systems for securing wheel covers to wheel assemblies can be molded from plastic materials using conventional processes. The outboard side of the wheel covers can also be finished using conventional techniques and processes.

DISCLOSURE OF THE INVENTION

According to various features, characteristics and embodiments of the present invention which will become apparent as the description thereof proceeds, the present invention provides a cover assembly for covering at least a portion of a wheel securable to a wheel hub by a plurality of lug nuts each having a locking ridge, the cover assembly including:

a cover having an outboard surface and an inboard surface;

a plurality of openings formed in the cover in a pattern that corresponds to a pattern by which lug nuts secure the wheel to the wheel hub; and a plurality of finger elements which extend axially from the inboard surface of the cover and are provided around a periphery of each of the plurality of openings and arranged to cooperate with the locking ridge of the lug nuts, the plurality of finger elements including first finger elements that engage a first surface of the locking ridges of the lug nuts and second finger elements that engage and apply a biasing force to a second opposite surface of the lug nuts when the wheel cover attached to the wheel.

The present invention further provides a cover assembly for covering at least a portion of a wheel securable to a wheel hub by a plurality of lug nuts each having a locking ridge, the cover assembly including:

a cover having an outboard surface and an inboard surface;

a plurality of openings formed in the cover in a pattern that corresponds to a pattern by which lug nuts secure the wheel to the wheel hub; and a plurality of finger elements which extend axially from the inboard surface of the cover and are provided around a periphery of each of the plurality of openings and arranged to cooperate with the locking ridge of the lug nuts, the plurality of finger elements including first finger elements that engage a first surface of the locking ridges of the lug nuts when the wheel cover attached to the wheel, second finger elements that engage and apply a biasing force to a second opposite surface of the lug nuts when the wheel cover attached to the wheel, and third finger elements which are configured to be deflected inward when contacted by either the first or second opposed side of the locking ridges of the lug nuts.

The present invention also provides an improvement to wheel assemblies that include a wheel mounted to a vehicle by a plurality of lug nuts that include locking flanges and a wheel cover secured to the lug nuts by the locking flanges, the improvement including:

a plurality of finger elements which extend axially from an inboard surface of the cover which plurality of finger elements are provided around a periphery of each of a plurality of openings formed in the wheel cover and arranged to cooperate with the locking ridge of the lug nuts, the plurality of finger elements including first finger elements that engage a first surface of the locking ridges of the lug nuts and second finger elements that engage and apply a biasing force to a second opposite surface of the lug nuts when the wheel cover attached to the wheel.

More generally, the present invention provides a mechanical system for securing decorative wheel covers to wheel assemblies which maintains a biasing force that will ensure a tight locking engagement and securement of the wheel covers against and thermal effects.

BRIEF DESCRIPTION OF DRAWINGS

The present invention will be described with reference to the attached drawings which are given as non-limiting examples only, in which.

BEST MODE FOR CARRYING OUT THE INVENTION

Figure 1:
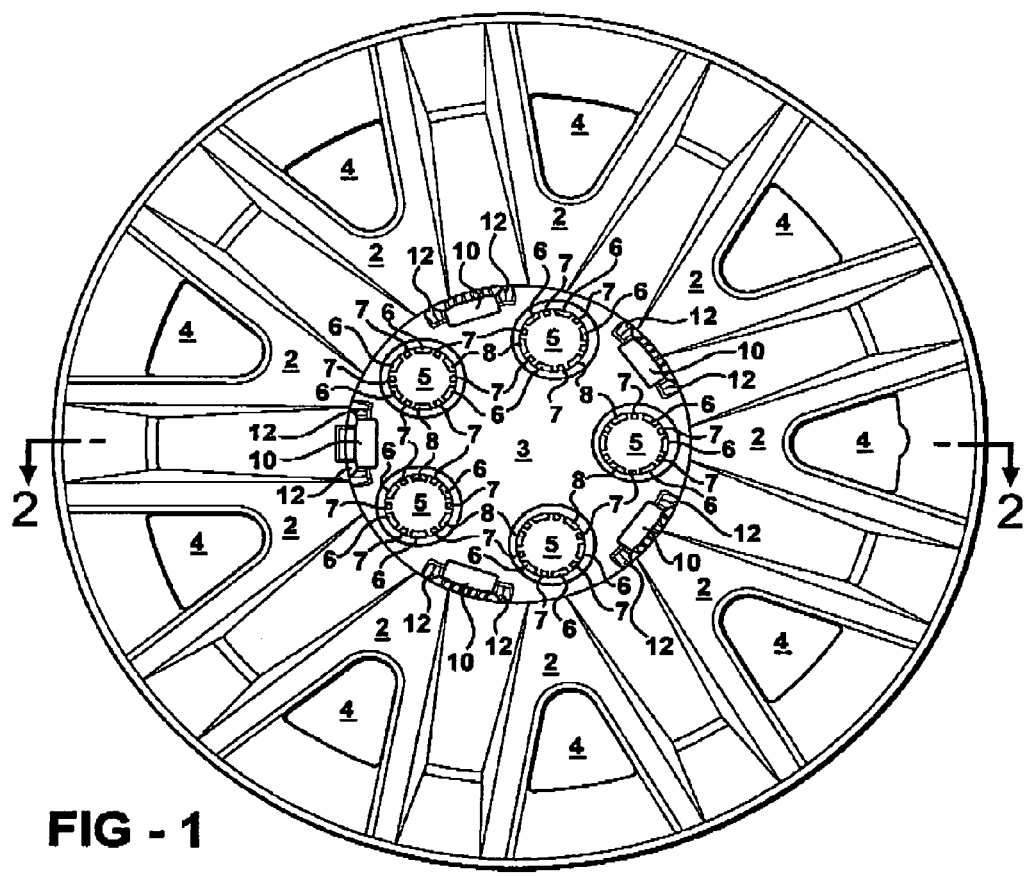
FIG. 1 is a top planar view of a wheel cover according to one embodiment of the present invention.

The present invention is directed to mechanical systems for securing wheel covers to wheel assemblies. The mechanic systems of the present invention include a plurality of differently configured finger elements that extend axially from the inboard side of the wheel covers. Each of the differently configured finger elements provides a different function which, in cooperation with the functions of the other finger elements, ensures the securement of a wheel cover on a wheel in such a manner that resists temperature changes or lessens undesired affects caused by temperature changes.

Accordingly to one embodiment, the plurality of differently configured finger elements includes first finger elements which are configured to engage locking flanges on lug nuts that are used to secure wheels on vehicle hubs, and second finger elements that are configured to impose a biasing force against the locking flanges on the lug nuts and thereby urge tight contact between the first finger elements and the locking flanges. This manner of creating a biasing force that urges tight contact between the first finger elements and the locking flanges compensates for thermal changes that would normally effect the securement of a wheel cover against a wheel mounted on a vehicle.

According to one embodiment of the present invention, the first finger elements are configured to include inward inclined lead-in or camming surfaces which are configured to cause the first fingers to deflect outward when contacted by first sides or surfaces of the locking flanges, and flanges which are configured to engage opposed second sides or surfaces of the locking flanges when the first finger elements return to their non-deflected positions (after the locking flanges clear the inclined lead-in or camming surfaces).

The second finger elements have curved or rounded heads at their free ends which are configured to deflect downward and inward when contacted by first sides or surfaces of the locking flanges. The second finger elements are configured and dimensioned to remain deflected and exert a biasing force on the first sides or surfaces of the locking flanges when the wheel cover is attached to a wheel.

Accordingly to another embodiment of the present invention the plurality of differently configured finger elements includes third finger elements that are configured to deflect inward when contacted by either the first or second side of the locking ridges of the lug nuts. According to one embodiment, the third finger elements include both inclined lead-in or camming surfaces and inclined lead-out or camming surfaces. The third finger elements and their positioning enable the disengagement of lug nuts from the mechanical systems of the present invention.

The mechanical systems for securing wheel covers to wheel assemblies according to the present invention are applicable to full sized wheel covers which cover substantially the entire outboard surface of a wheel and are equally applicable to smaller wheel covers including those that are configured only to cover the central hub area of a wheel assembly. The mechanical systems for securing wheel covers to wheel assemblies according to the present invention can be used in conjunction with multi-piece wheel ornamentations such as full size covers that include separate central covers.

The mechanical systems for securing wheel covers to wheel assemblies according to the present invention can be used in conjunction with addition mechanical securing means that are located radially outward from the hub area of the wheels. In addition, the mechanical systems for securing wheel covers to wheel assemblies according to the present invention can be used in conjunction with stand-off elements or auxiliary supports or braces which according to one embodiment include hollow legs that extend axially from the inboard side of the wheel covers and are configured to receive an insert such as a vibration dampening or absorbing material or pad which is positioned between the wheel cover and a wheel.

FIG. 1 is a top planar view of a wheel cover according to one embodiment of the present invention. The wheel cover which is generally identified by reference numeral 1 includes a decorative design that has a plurality of split spokes 2 that radiate out from a central recessed hub area 3 and a plurality of brake vent openings or windows 4 which are interspaced with the spokes 2.

A mechanical system for securing wheel covers to wheel assemblies is provided within the central recessed hub area 3. The mechanical securement system includes a plurality of differently configured finger elements that extend axially from the inboard side of the wheel covers. These finger elements are arranged to extend from circular patterns that, as shown in FIG. 1, correspond in shape, alignment and position of lug nuts that are used to secure wheels on to vehicle hubs (not shown). Each of the various finger elements includes a free end which projects inwardly so that, as seen in FIG. 1 the free ends of the various finger elements 6, 7 and 8 can be seen as extending radially inward of openings 5.

The central recessed hub receiving area 3 includes an annular wall 9 which is substantially perpendicular to face of the wheel cover 1 as viewed in FIG. 1, and a bottom surface which can be substantially flat or contoured to conform to the hub area of a wheel to which the wheel cover 1 is to be attached. Spaced evenly around the annular wall 9 of the wheel cover 1 of FIG. 1 are central cap retention projections 10 which are configured to engage and retain a central cap 13 which covers central recessed hub area 3. It is to be understood that in addition to the central cap retention projections 10 which are shown in FIG. 1, other conventional means for securing the central cap 13 to the wheel cover can be used such as recesses in the annular wall 9 which cooperate with biased catch structures on the central cap 13.

The mechanical system for securing wheel covers to wheel assemblies shown in FIG. 1 includes three different types of finger elements 6, 7, and 8 which cooperate together as discussed below to keep the wheel covers 1 tight against the wheel assemblies. FIG. 1 illustrates one manner in which the different finger elements 6, 7 and 8 can be arranged around the perimeter of each opening 5. As shown in FIG. 1 one type of finger element 6 is provided so that four of these finger elements 6 are along the periphery of each opening 5 with a pair aligned on opposite sides of the openings 5 along radial lines that extend through the center of the wheel cover 1 and a second pair provided on a radially outward periphery portion of the openings 5 on either side of the radially innermost finger element 6. These finger elements 6 are discussed in more detail in reference to FIG. 4 below. A second pair of finger elements 8 is provided on a radially inward periphery portion of the openings 5 on either side of the radially innermost finger element 6. Third finger elements 7 are provided between each of the first and second finger elements 6 and 8 around the periphery of openings 5.

Figure 2:
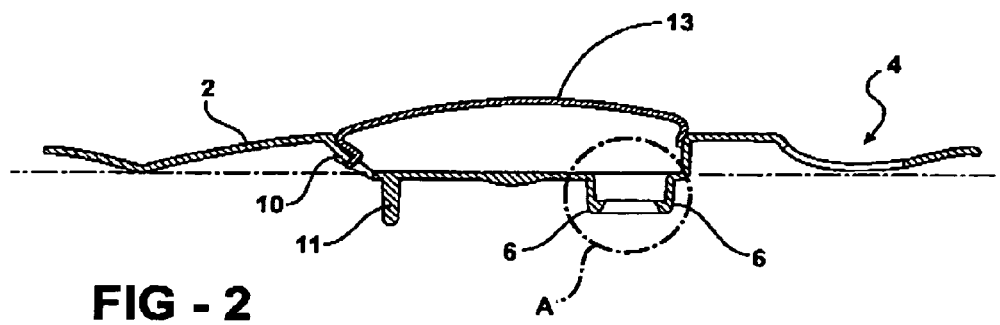
FIG. 2 is a cross-sectional view taken along section line II—II in FIG. 1.

FIG. 2 is a cross-sectional view taken along section line II—II in FIG. 1. The cross-section or profile of one of the central cap retention projections 10 is shown in FIG. 2 together with the cross-sections or profiles of opposed finger elements 6 which are discussed in more detail below in reference to FIG. 4. A plurality of legs 11 are provided which extend axially from the inboard side of the wheel cover 1 and are located adjacent the central recessed hub area 3 of the wheel cover 1 and dimensioned to space the wheel cover 1 in reference to an outboard side of the wheel when the wheel cover 1 is attached to a wheel.

Figure 3:
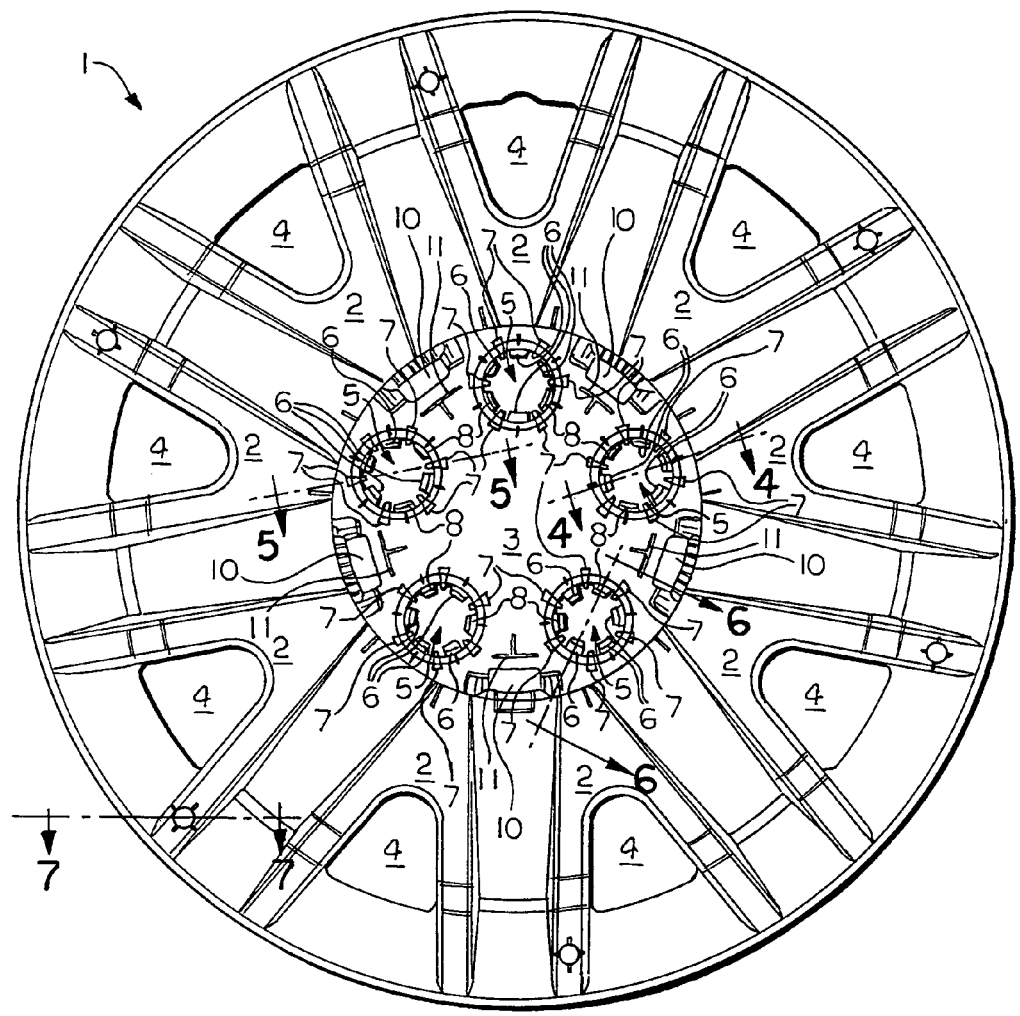
FIG. 3 is a bottom planar view of the wheel cover of FIG. 1.

FIG. 3 is a bottom planar view of the wheel cover of FIG. 1. The legs 11 are shown as being spaced in a circular pattern and between openings 5 in FIG. 3. In addition, the cross section of the legs is non-linear, but includes an arcuate potion and a central radially inward projecting portion. It is to be understood that the legs 11 are not limited to the cross-sectional shape shown in FIG. 3 or to their positions shown in FIG. 3. The legs 11 can have any cross-sectional shape that is sturdy and can be positioned in any convenient manner near openings 5.

From FIGS. 1 and 3 it can be seem that the central cap retention projections 10 can include locating or alignment structures 12 into which a complementary alignment structure on the inboard side of a central cap can be received. From FIGS. 1 and 3 it can also be seen that, in the illustrated embodiment of the invention, finger elements 6 and 8 have generally arc-shaped cross-sectional shape with finger elements 6 having a slightly larger radial width than finger elements 8. Finger elements 7 have a wedge or triangular shaped cross section.

Figure 4:
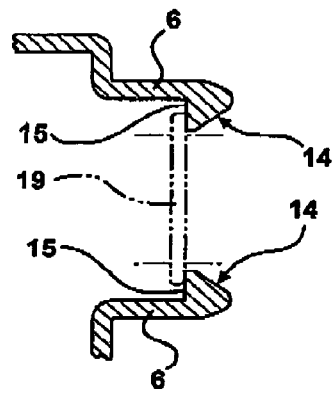
FIG. 4 is an enlarged view of section "A" of FIG. 2.

FIG. 4 is an enlarged view of section "A" of FIG. 2. FIG. 4 shows finger elements 6 in cross-section. The free ends of finger elements 6 are provided with an inward inclined lead-in surface 14 which is configured to deflect the finger elements 6 outward when the wheel cover 1 is pushed toward a wheel and the inclined lead-in surfaces 14 of finger elements 6 engage a locking ridge 19 of a standard lug nut (shown in phantom lines) used to secure a wheel on a vehicle hub. The free ends of finger elements 6 also include flanges 15 which are configured to engage the locking ridge of the standard lug nut after the free end of the finger elements 6 pass over the locking ridge 19. Flanges 15 of finger elements 6 function primarily to secure the wheel cover 1 against a wheel by engagement with the lug nuts.

Figure 5:
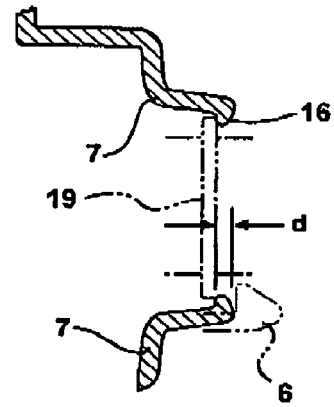
FIG. 5 is a cross-sectional view taken along section line V—V in FIG. 3.

FIG. 5 is a cross-sectional view taken along section line V—V in FIG. 3. FIG. 5 shows finger elements 7 in cross-section, and in reference to an adjacent finger element 6. The free ends of finger elements 7 have curved or rounded heads 16 which are configured to deflect the finger elements 7 downward and inward when engaged by a locking ridge of a standard lug nut. FIG. 5 indicates a possible gap or space "d" between the flange 15 of finger elements 6 and the heads 16 of finger elements 7. This gap or space "d" can be increased by deflecting finger elements 7 downward and inward, in which case a biasing force is created which tends to push the finger elements 7 back upward in their normal configuration. When the wheel cover 1 is pressed onto a wheel which is secured to a vehicle hub by standard lug nuts having locking ridges 19 (See for example U.S. Pat. No. 6,135,570), flanges 15 of finger elements 6 engage and secure one side of the locking ridges 19 and the heads 16 of finger elements 7 abut and are pushed downward and inward by the opposite side of the locking ridges 19. Therefore, the heads 16 of finger elements 7 exert a biasing force on the locking ridges 19 which biasing force secures the attachment of the wheel covers 1 against any variations which can result from thermal effects.

Figure 6:
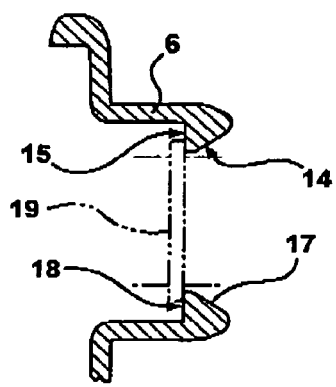
FIG. 6 is a cross-sectional view taken along section line VI—VI in FIG. 3.

FIG. 6 is a cross-sectional view taken along section line VI—VI in FIG. 3. FIG. 6 shows a finger element 8 in cross-section, and in reference to a finger element 6. The free ends of finger elements 8 are provided with an inward inclined lead-in surface 17 which is configured to deflect the finger elements 8 outward when the wheel cover 1 is pushed toward a wheel and the lead-in surfaces 17 of finger elements 8 engage a locking ridge 19 of a standard lug nut (shown in phantom lines) used to secure a wheel cover 1 on a vehicle hub. The free ends of finger elements 8 also include outward inclined lead-out surfaces 18 adjacent the inward inclined lead-out surfaces 17 as shown. The outward inclined lead-out surfaces 18 which allow fingers elements 8 to deflect outwardly to release the locking ridge of the standard lug nut (shown in phantom lines) in order to release the lug nuts from engagement with the wheel cover 1.

Figure 7:
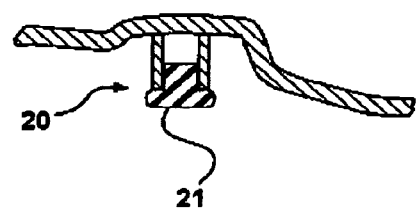
FIG. 7 is a cross-sectional view taken along section line VII—VII in FIG. 2.

FIG. 7 is a cross-sectional view taken along section line VII—VII in FIG. 3. FIG. 7 shows a cross-sectional view of a hollow leg 20 that extends axially from the inboard side of the wheel cover 1. This hollow leg 20 is configured to receive an insert 21 which can be made from a material that dampens or absorbs vibration between the wheel cover 1 and an underlying wheel.

Although the present invention has been described with reference to particular means, materials and embodiments, from the foregoing description, one skilled in the art can easily ascertain the essential characteristics of the present invention and various changes and modifications can be made to adapt the various uses and characteristics without departing from the spirit and scope of the present invention as described above.

What is claimed is:

1. A cover assembly for covering at least a portion of a wheel securable to a wheel hub by a plurality of lug nuts each having a locking ridge, the cover assembly including:
   a cover having an outboard surface and an inboard surface;
   a plurality of openings formed in the cover in a pattern that corresponds to a pattern by which lug nuts secure the wheel to the wheel hub; and
   a plurality of independently deflectable finger elements which extend axially from the inboard surface of the cover and are provided around a periphery of each of said plurality of openings and arranged to cooperate with the locking ridge of the lug nuts, said plurality of independently deflectable finger elements including first deflectable finger elements that engage a first surface of the locking ridges of the lug nuts and second deflectable finger elements that engage and apply a biasing force to a second opposite surface of the lug nuts when the wheel cover is attached to the wheel.

2. A cover assembly according to claim 1, wherein said second deflectable finger elements are evenly spaced around each of the plurality of openings.

3. A cover assembly according to claim 1, wherein the first deflectable finger elements are provided so that each of the plurality of openings includes a pair of diametrically opposed first deflectable finger elements aligned along a radius of the wheel cover.

4. A cover assembly according to claim 1, wherein the first deflectable finger elements each are configured to deflect radially outward from a central axis that passes through the opening to which the first deflectable finger elements are peripherally located when contacted by the second surfaces of the locking ridges of the lug nuts as the wheel cover is pushed into contact with the wheel and each of the first deflectable finger elements includes a flange that engages the first surfaces of the locking ridges of the lug nuts when the wheel cover is attached to the wheel.

5. A cover assembly according to claim 1, wherein the second deflectable finger elements each are configured to deflect radially inward from a central axis tat passes through the opening to which the second deflectable finger elements are peripherally located and axially away from the wheel when contacted by the second surfaces of the locking ridges of the lug nuts as the wheel cover is pushed into contact with the wheel and each of the second deflectable finger elements is further configured to remain deflected by the second surfaces of the locking ridges of the lug nuts when the wheel cover is attached to the wheel to thereby induce a biasing force against the second surfaces of the locking ridges of the lug nuts.

6. A cover assembly according to claim 1, wherein said plurality of independently deflectable finger elements further includes third deflectable finger elements which are configured to be deflected radially inward from a central axis that passes through the opening to which the third deflectable finger elements are peripherally located when contacted by either the first or second opposed side of the locking ridges of the lug nuts.

7. A cover assembly according to claim 1, wherein the wheel cover includes a plurality of legs which extend axially from the inboard side of the wheel cover which are arranged between the openings.

8. A cover assembly according to claim 1, wherein the wheel cover includes a plurality of hollow legs which extend axially from the inboard side of the wheel cover and are arranged near an outer periphery of the wheel cover.

9. A cover assembly according to claim 8, wherein the hollow legs receive an insert that is positioned between the wheel cover and the wheel.

10. A cover assembly according to claim 1, wherein the wheel cover includes a central recessed hub area which is recessed from the outboard side and includes an annular wall, within said central recessed hub area the plurality of openings are formed.

11. A cover assembly according to claim 10, further including central cap retention projections along the annular wall of the central recessed hub area for securing a cap over the central recessed hub area.

12. A cover assembly for covering at least a portion of a wheel securable to a wheel hub by a plurality of lug nuts each having a locking ridge, the cover assembly including:

a cover having an outboard surface and an inboard surface;

a plurality of openings formed in the cover in a pattern that corresponds to a pattern by which lug nuts secure the wheel to the wheel hub; and a plurality of independently deflectable finger elements which extend axially from the inboard surface of the cover and are provided around a periphery of each of said plurality of openings and arranged to cooperate with the locking ridge of the lug nuts, said plurality of independently deflectable finger elements including first deflectable finger elements that engage a first surface of the locking ridges of the lug nuts when the wheel cover attached to the wheel, second deflectable finger elements that engage and apply a biasing force to a second opposite surface of the lug nuts when the wheel cover attached to the wheel, and third deflectable finger elements which are configured to be deflected radially inward from a central axis that passes through the opening to which the third deflectable finger elements are peripherally located when contacted by either the first or second opposed side of the locking ridges of the lug nuts.

13. A cover assembly according to claim 12, wherein the first deflectable finger elements each are configured to deflect radially outward from a central axis that passes through the opening to which the first deflectable finger elements are peripherally located when contacted by the second surfaces of the locking ridges of the lug nuts as the wheel cover is pushed into contact with the wheel and each of the first finger elements includes a flange that engages the first surfaces of the locking ridges of the lug nuts when the wheel cover is attached to the wheel.

14. A cover assembly according to claim 12, wherein along the periphery of each of said plurality of openings, every other one of the deflectable finger elements is one of the second deflectable finger elements.

15. A cover assembly according to claim 12 wherein a pair of the third deflectable finger elements are provided along an inner half of the periphery of each of said plurality of openings with one of the first deflectable finger elements position therebetween and only ones of the first and second deflectable finger elements are provided along an outer half of the periphery of each of said plurality of openings.

16. A cover assembly according to claim 12, wherein the wheel cover includes a central recessed hub area which is recessed from the outboard side and includes an annular wall, within which central recessed hub area the plurality of openings are formed.

17. A cover assembly according to claim 16, further including a plurality of legs which extend axially from the inboard side of the wheel cover adjacent the central hub area, which plurality of legs are arranged between the openings.

18. A cover assembly according to claim 16, further including central cap retention projections along the annular wall of the central recessed hub area to securing a cap over the central hub area.

19. In a wheel assembly that includes a wheel mounted to a vehicle by a plurality of lug nuts that include locking flanges and a wheel cover secured to the lug nuts by the locking flanges, the improvement comprising:

a plurality of independently deflectable finger elements which extend axially from an inboard surface of the cover, said plurality of independently deflectable finger elements are provided around a periphery of each of a plurality of openings formed in the wheel cover and arranged to cooperate with the locking ridge of the lug nuts, said plurality of independently deflectable finger elements including first deflectable finger elements that engage a first surface of the locking ridges of the lug nuts and second deflectable finger elements that engage and apply a biasing force to a second opposite surface of the locking ridges of the lug nuts when the wheel cover attached to the wheel.

20. A cover assembly according to claim 19, wherein the first deflectable finger elements each are configured to deflect radially outward from a central axis that passes through the opening to which the first deflectable finger elements are peripherally located when contacted by the second surfaces of the locking ridges of the lug nuts as the wheel cover is pushed into contact with the wheel and each of the first deflectable finger elements includes a flange that engages the first surfaces of the locking ridges of the lug nuts when the wheel cover is attached to the wheel.

21. cover assembly according to claim 19, wherein the second deflectable finger elements each are configured to deflect radially inward from a central axis that passes through the opening to which the second deflectable finger elements are peripherally located and away from the wheel when contacted by the second surfaces of the locking ridges of the lug nuts as the wheel cover is pushed into contact with the wheel and each of the second deflectable finger elements is further configured to remain deflected by the second surfaces of the locking ridges of the lug nuts when the wheel cover is attached to the wheel to thereby induce a biasing force against the second surfaces of the locking ridges of the lug nuts.

22. A cover assembly according to claim 19, wherein said plurality of independently deflectable finger elements further includes third deflectable finger elements which are configured to be deflected radially inward from a central axis that passes through the opening to which the third deflectable finger elements are peripherally located when contacted by either the first or second opposed side of the locking ridges of the lug nuts.

\* \* \* \* \*

UNITED STATES PATENT AND TRADEMARK OFFICE
CERTIFICATE OF CORRECTION

PATENT NO. : 7,108,334 B2 Page 1 of 1
APPLICATION NO. : 10/892408
DATED : September 19, 2006
INVENTOR(S) : Jeff Bruce It is certified that error appears in the above-identified patent and that said Letters Patent is hereby corrected as shown below:

Col. 7, line 29, change "tat" to --that--

Signed and Sealed this

Tenth Day of April, 2007

JON W. DUDAS
*Director of the United States Patent and Trademark Office*